Nov. 20, 1962  G. W. ONKSEN  3,064,378
LAMP ASSEMBLY
Filed Oct. 26, 1959  2 Sheets-Sheet 1

INVENTOR.
George W. Onksen
BY
E. E. McGlynn Jr.
ATTORNEY

Nov. 20, 1962  G. W. ONKSEN  3,064,378
LAMP ASSEMBLY
Filed Oct. 26, 1959  2 Sheets-Sheet 2

INVENTOR.
George W. Onksen
BY
ATTORNEY

United States Patent Office 3,064,378
Patented Nov. 20, 1962

1

3,064,378
LAMP ASSEMBLY
George W. Onksen, Anderson, Ind., assignor to General Motors Corporation, Detroit, Mich., a corporation of Delaware
Filed Oct. 26, 1959, Ser. No. 848,703
4 Claims. (Cl. 40—204)

The present invention relates to a lamp assembly and, more particularly, to a lamp assembly which will provide adequately blended illumination for a closely located member to be illuminated such as, specifically, an automobile license plate.

With reference to the detailed description of the invention which follows, it will become apparent that those skilled in the art will recognize other environments in which the invention may be utilized to advantage. However, in order to set forth the nature of the invention with sufficient particularity, reference will be made specifically to the use of the inventive lamp assembly as a means for illuminating the license plate of an automotive vehicle, and for which purpose the inventive assembly is particularly adapted and intended to be employed.

Most, if not all, local State governments have specifications relating to illumination of license plates. Briefly, these regulations require that, in addition to a minimum degree of illumination of any portion of the plate, the illumination must not be characterized by marked contrasts; that is, approval of the license lamp assemblies will be withheld if any portion of the license plate is illuminated with an intensity exceeding that of another darker portion of the plate by some specified maximum extent. In recent years, this problem has not been too troublesome inasmuch as plural lamps have been employed to balance illumination of the license plate or, if only one lamp was employed, it has been located far enough from the license plate to provide blended illumination of the latter without the objectionable marked contrasts aforementioned. However, if a single license lamp is located extremely close to one portion of a license plate and extremely remote from another portion thereof, the closer portion of the plate receives "hot shot" light which intensely illuminates that portion of the plate as compared to the much darker more remote portion thereof. In such a situation, a serious problem is presented in providing license plate illumination which will meet the State regulations aforementioned.

It is, therefore, a principal object and feature of this invention to provide an illuminating lamp assembly comprising a light transmitting lens having a plurality of optical elements constructed and arranged so as to emit a blended light pattern onto a member having surfaces located at varying distances from the lamp assembly.

It is another object and feature of this invention to provide in combination with a member to be illuminated, such as a license plate, an illuminating lamp assembly located immediately adjacent one portion of the member and including a lens having a plurality of optical elements thereon so located between the light source and closer and more remote portions of the member as to blend the light pattern across the surface of the member to be illuminated.

It is yet a more specific object and feature of this invention to provide an illuminating lamp assembly of the type aforementioned which comprises a plurality of catadioptric rings on the inner surface of the lens between the member to be illuminated, such as a license plate, and the light source of the lamp, the rings being substantially equidistantly spaced and identical in cross section while progressively varying in height from a higher ring closely located to said member to a lower ring more remote from

2 said member whereby the higher rings will gather more light than the lower rings and spread a portion of this light to more remote portions of the member to be illuminated thereby blending the illumination of the entire surface of the member.

In general, these and other objects of this invention are attained in a lamp assembly comprising a lens having an inner light receiving surface and an outer light emitting surface. A plurality of catadioptric lens rings are turned or otherwise formed on the light receiving surface of the lens, and are substantially equidistantly spaced and similar in cross section while progressively varying in height. With respect to the license plate or other member to be illuminated, the assembly may be mounted with the lens aforementioned located closer to certain portions of the plate than other portions and, more particularly, with the higher catadioptric rings generally aligned between the light source and the closer portions of the plate. Consequently, upon energizing the light source, the light rays which otherwise would cause "hot shot" illumination of the closer portions of the plate are gathered by the higher lens rings and, while some of this light is directed to the closer portions of the plate, some of the light is redirected toward more remote portions of the plate and, in cooperation with light gathered by the lower rings, illuminates such remote portions. Accordingly, a blended light pattern is directed upon the entire surface of the license plate thereby avoiding marked contrasts in illumination.

These and other objects of the invention and the manner in which they are attained will become more apparent hereinafter as the description of the invention proceeds, and in which reference is made to the following drawings in which.

Figures 1, 2:
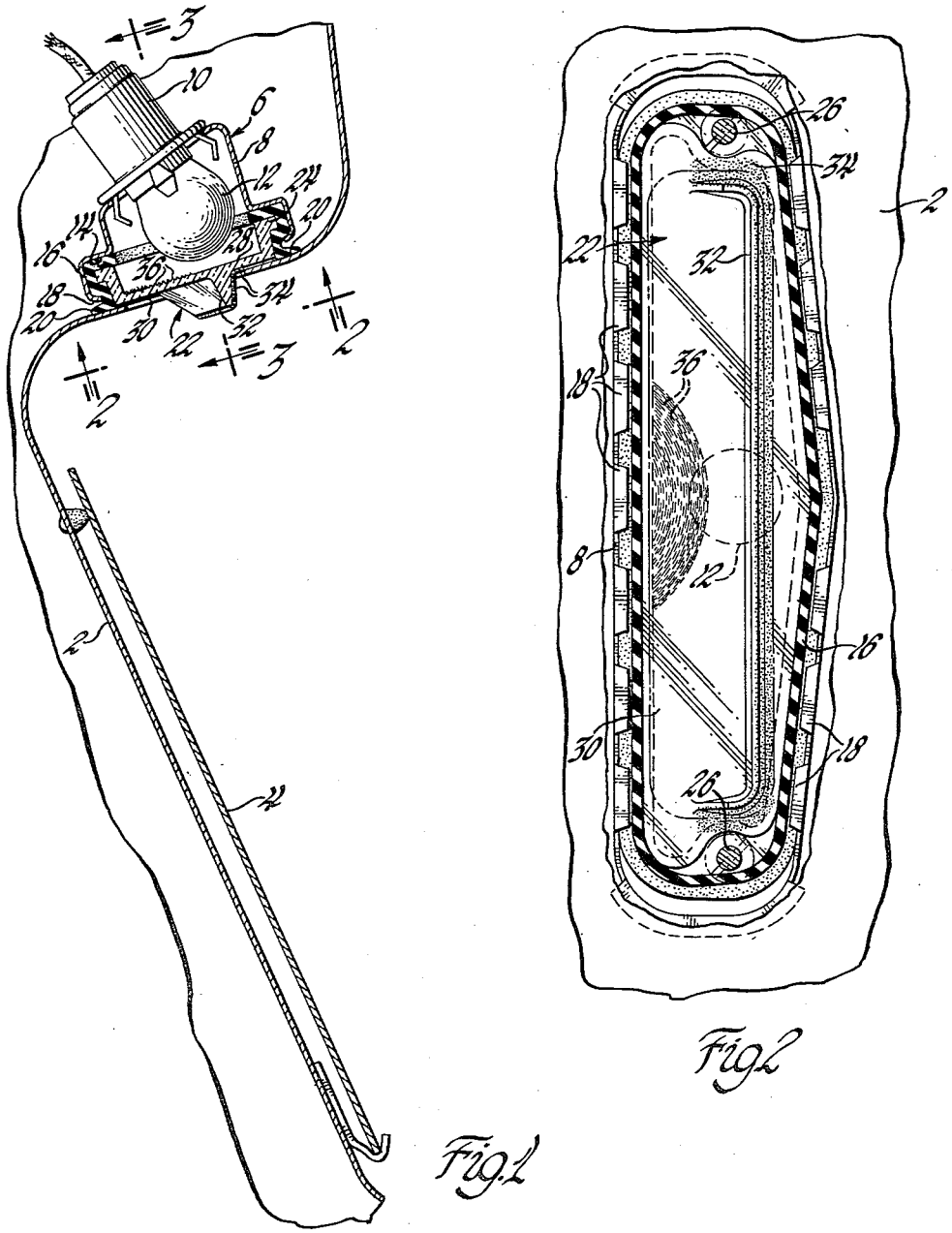
FIGURE 1 is a side elevation, in section, of the rear of an automotive passenger vehicle equipped with a rear license plate and the lamp assembly of this invention.
FIGURE 2 is a view taken on line 2—2 of FIGURE 1.
Figure 3:
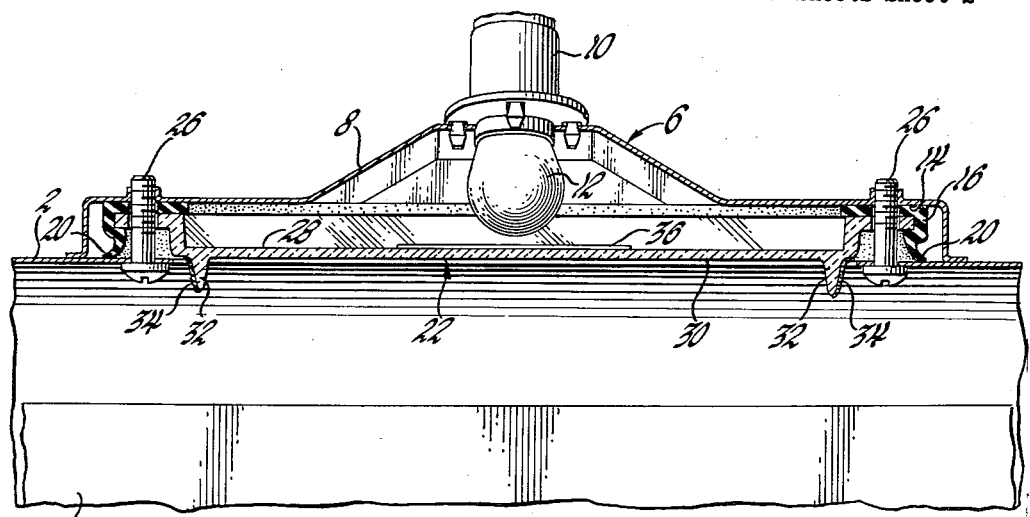
FIGURE 3 is a view taken on line 3—3 of FIGURE 1.
Figure 4:
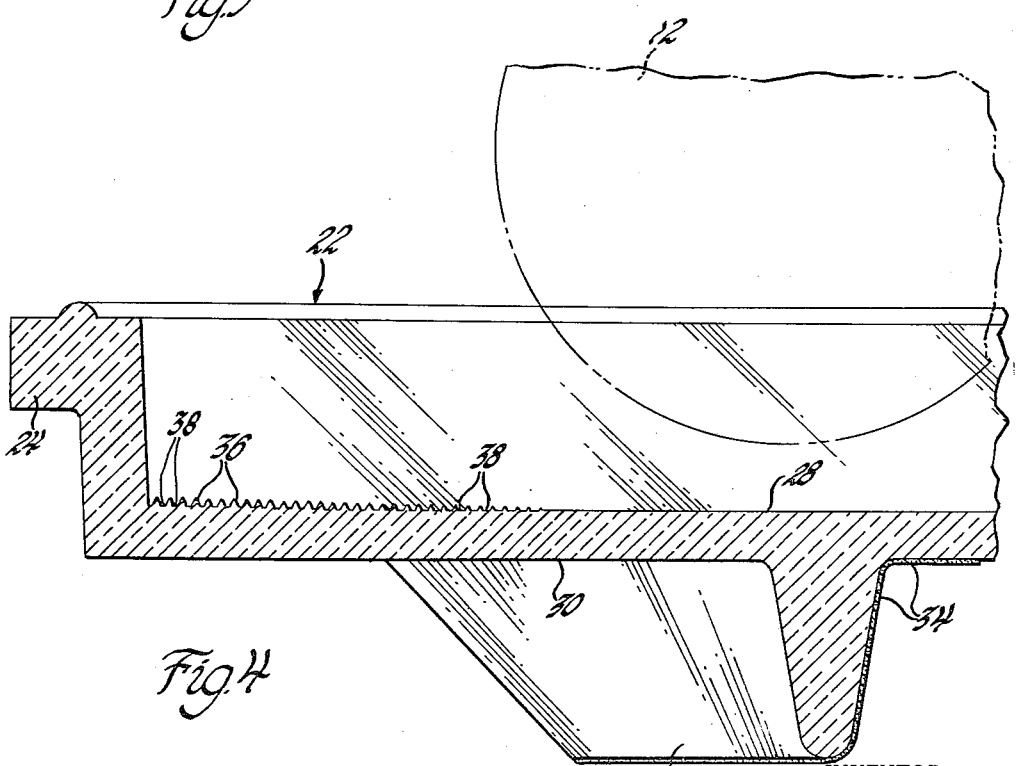
FIGURE 4 is a greatly enlarged fragmentary view of FIGURE 1 showing certain details of the lamp lens construction.

Referring now to the drawings, the numeral 2 indicates a rearwardly presented body panel of an automotive vehicle on which a transversely extending license plate 4, of conventional construction, is adapted to be mounted. The lamp assembly 6 is adapted to be mounted immediately above and to the rear of the upper transversely extending edge of the license plate.

The lamp assembly 6 comprises a laterally elongate metal body 8 in which a conventional socket structure 10 is suitably secured for removably receiving the light bulb 12. The body 8 is provided with a substantially continuous shoulder 14 against which the lens-retaining gasket 16 is adapted to be seated. A plurality of spaced tabs 18 along the edge of the body 8 are adapted to be clinched over against a shoulder on the gasket 16 to retain the latter in position. When the assembly is installed, the edge or lip 20 of the gasket sealingly engages the inner surface of body 2. The lens 22 includes a peripheral shoulder 24 adapted to be seated and retained within a groove in the gasket 16 by the fasteners 26 extending through the opposite ends of the lens into the lamp body 8.

The lens 22 comprises a light receiving inner surface 28 and an exterior light emitting surface 30. The outer surface 30 and a major rearwardly located portion of the inner surface 28 are substantially flat and parallel to each other. A generally U-shaped downwardly depending rib 32 formed integral with the outer surface 30 of the lens includes an elongate base portion located generally in the rearward or outer half of the lens along the edge of the lens most remote from the license plate, while the side legs thereof project toward the opposite edge of the lens to a limited extent. Additionally, the rearwardly and sidewardly facing surfaces of the rib 32 and a rearward portion of lens surface 30 are painted with a dull black lacquer, as indicated at 34, or otherwise rendered opaque for reasons to be set forth hereinafter. The forward portion of the inner surface of the lens 28 is provided with a plurality of light receiving and directing optical elements herein shown in the form of the catadioptric lens rings 36.

At this juncture, and with reference to a consideration of FIGURE 2 in particular, it will be noted that each of the lens rings is actually merely an arcuate segment of a ring. However, in this specification and the claims appended hereto, the term "ring" is intended to convey its commonly accepted meaning as referring to an entire, complete or continuous ring or such arcuate segment thereof.

The lens rings 36 are so related to the license plate 2 and the filament of the bulb 12 so that light rays which otherwise would cause "hot shot" illumination of the upper portion of the plate are diffused to augment the illumination of the lower portions of the plate. To this end, in the present embodiment of the invention, thirty-two individual rings are formed on the inner surface of the lens, ring No. 1 being located closest to the center portion of the lens while ring No. 32 is most remote therefrom and actually merges with the forward edge of the lens. Each ring is formed by making an identical V-cut on the inner surface of the lens, in this case a 60° V-cut, while the apices of the rings are equidistantly spaced from each other, in this case on .015" centers. Moreover, the depths of the rings progressively increase from ring No. 1 to ring No. 32 according to the following table.

| Ring: | Depth (in.) |
|---|---|
| 1 to 2 | .001 |
| 3 to 4 | .002 |
| 5 to 6 | .003 |
| 7 to 9 | .004 |
| 10 to 12 | .005 |
| 13 to 15 | .006 |
| 16 to 18 | .007 |
| 19 to 21 | .008 |
| 22 to 24 | .009 |
| 25 to 28 | .010 |
| 29 to 32 | .011 |

In this specific construction, the side walls of adjacent rings do not merge into each other but terminate at the inner lens surface. As a consequence, flat rings 38 will be formed on inner lens surface 28 between each adjacent pair of catadioptric rings, and these flat annular surfaces will become progressively smaller or narrower in radial width from ring No. 1 toward outermost ring No. 32. However, in the particular assembly shown, the location of light source 12 is such that direct light is intercepted by certain higher or more remote rings 36 and does not reach the flat surfaces therebetween, but does strike the flat surfaces between shallower rings beginning with approximately rings Nos. 22 and 23. On the other hand, it should be noted that this construction is variable depending upon the relative positioning of parts in any given installation. For example, in any given installation, the side walls of rings 36 may converge at a predetermined outer ring other than the outermost ring and the first flat surface 38 between rings to actually receive direct light may likewise vary.

Referring now to FIGURE 1 of the drawings, it will be noted that the bulb 12 is relatively closely located to the upper edge of the license plate 4 as compared to more remote portions such as the lower edge thereof. Accordingly, if the lens 22 were of conventional design, the upper edge of the plate would receive relatively intense "hot shot" light in great contrast to the illumination on the lower edge thereof. However, by utilizing the lens construction of this invention and, in particular, the specific design of the lens rings 36, the light from the bulb 12 which otherwise would produce this "hot shot" effect is partially redirected and diffused so as to augment the illumination of lower portions of the plate.

Thus, in the assembly shown in FIGURE 1, it will be appreciated that catadioptric ring No. 1, which is the lowest of all thirty-two rings, will lie in a direct line between the bulb 12 and a lower portion and remote side portions of the license plate 4. On the other hand, the catadiaptric ring No. 32, which is immediately adjacent the forward edge of the lens, lies substantially on a direct line between the bulb 12 and the upper portion of the license plate. Thus, in effect, it will be seen that the portions of the lens 22 which are approximately or substantially in a direct line between the bulb 12 and the closer portions of the license plate are equipped with the deeper rings. Stated in another way, if ring No. 32 is formed on the lens on a line directly between the upper edge of the license plate and the bulb 12, then it follows that the progressively shorter rings are formed on the lens in direct lines between the bulb 12 and progressively more remote portions of the license plate.

As a result of this construction, and with the bulb 12 illuminated, the higher catadioptric rings capture and redirect for diffusion purposes a greater proportion of the light emanating from the bulb 12 than the lower rings. Moreover, it will again be noted that this light is the light which heretofore has caused the difficulty with "hot shot" illumination of the plate. As a consequence, a portion of these light rays illuminate the upper or closer portion of the license plate, while other of these rays are diffused so as to augment the lesser amount of light being received and redirected by the shallower rings. In this regard, the flat annular rings 38 pass light therethrough with slight refraction toward the lower and side or more remote portions of the plate. The net result of the structure aforedescribed is to blend the light rays emanating from the bulb 12 so as to avoid any marked contrast in illumination of the license plate 4. The painted area 34 on the rib 32 prevents direct white light from the bulb 12 from being visible a substantial distance down the road to the rear of the vehicle.

While but one form of the invention has been selected for an illustration thereof, other forms will be apparent to those skilled in the art. Therefore, the embodiment shown in the drawings is merely for illustrative purposes, and is not intended to limit the scope of the invention which is defined by the claims which follow.

I claim:

1. In combination, a surface to be illuminated and an illuminating lamp assembly, said surface having portions thereof located at varying distances from said assembly; said assembly comprising a lamp body, a light source supported on said body, a lens secured to said body and including a light receiving surface and a light emitting surface, one of said surfaces including a base surface, and a plurality of optical elements projecting from said base surface of said lens between said surface to be illuminated and light source, said elements being substantially equidistantly spaced and progressively varying in height from a higher element closely located to said surface to be illuminated to a lower element more remote from said surface.

2. In combination, a surface to be illuminated and an illuminating lamp assembly, said surface having portions thereof located at varying distances from said assembly; said assembly comprising a lamp body, a light source supported on said body, a lens secured to said body and including a light receiving surface and a light emitting surface, one of said surfaces including a base surface, and a plurality of optical elements projecting from said base surface of said lens between said surface to be illuminated and light source, said elements having substantially similar triangular cross sections and progressively varying in height from a higher element closely located to said surface to be illuminated to a lower element more remote from said surface.

3. In combination, a surface to be illuminated and an illuminating lamp assembly, said surface having portions thereof located at varying distances from said assembly; said assembly comprising a lamp body, a light source supported on said body, a lens secured to said body and including an inner surface receiving light rays from said source, and a plurality of catadioptric rings projecting from the inner surface of said lens between said surface to be illuminated and light source, said rings being substantially equidistantly spaced and having substantially similar triangular cross sections and progressively varying in height from a higher ring closely located to said surface to be illuminated to a lower ring more remote from said surface.

4. In combination, a license plate to be illuminated and an illuminating lamp assembly, said plate having portions thereof to be illuminated located at varying distances from said assembly; said assembly comprising a lamp body, a light source supported on said body, a lens secured to said body and including an inner surface receiving light rays from said source, a plurality of catadioptric rings projecting from the inner surface of said lens between said plate and light source, said rings being substantially equidistantly spaced and having substantially similar triangular cross sections nad progressively varying in height from a higher ring closely located to said plate to a lower ring more remote from said plate, and flat rings of progressively varying width on said inner surface between adjacent catadioptric rings.

References Cited in the file of this patent

UNITED STATES PATENTS

| | | |
|---|---|---|
| 1,694,660 | Little | Dec. 11, 1928 |
| 1,795,940 | Falge | Mar. 10, 1931 |
| 1,922,618 | Dickson | Aug. 15, 1933 |
| 2,260,228 | Moller et al. | Oct. 21, 1941 |
| 2,290,100 | Goris | July 14, 1942 |
| 2,344,295 | Franck | Mar. 14, 1944 |
| 2,831,394 | Heenan et al. | Apr. 22, 1958 |
| 2,853,599 | Kliegl | Sept. 23, 1958 |
| 2,881,686 | Ruhle | Apr. 14, 1959 |

FOREIGN PATENTS

| | | |
|---|---|---|
| 465,376 | Italy | Aug. 25, 1951 |